United States Patent [19]

Baynes et al.

[11] Patent Number: 4,676,221
[45] Date of Patent: Jun. 30, 1987

[54] BARBECUE GRILL WITH UNIFORMLY-HEATED HEATING CHAMBER

[75] Inventors: William R. Baynes, Perry County, Ill.; Richard H. Merrick, Warick County, Ind.

[73] Assignee: Turco Incorporated Company, DuQuoin, Ill.

[21] Appl. No.: 931,970

[22] Filed: Nov. 24, 1986

Related U.S. Application Data

[63] Continuation of Ser. No. 778,694, Sep. 23, 1985, abandoned.

[51] Int. Cl.⁴ .............................................. F24C 3/04
[52] U.S. Cl. .................................. 126/41 R; 126/39 E
[58] Field of Search ........................... 126/41 R, 39 E; 239/553

[56] References Cited

U.S. PATENT DOCUMENTS

| | | | |
|---|---|---|---|
| 615,737 | 12/1898 | Newton | 239/553 |
| 678,624 | 7/1901 | McKallip | 239/553 |
| 2,578,227 | 12/1951 | Chambers | 126/41 |
| 4,488,534 | 12/1984 | Koziol | 126/41 R |

Primary Examiner—Carroll B. Dority, Jr.
Attorney, Agent, or Firm—Rey Eilers

[57] ABSTRACT

The present invention provides a uniformly-heated heating chamber for a barbecue grill by mounting two U-shaped burners within that heating chamber so the arms thereof extend toward each other to help define a generally rectangular annulus which surrounds the middle of that heating chamber and which is displaced inwardly from the walls of that heating chamber. Gas-emitting ports are provided in the inner and outer faces of the arms and ends of those burners; and hence a central area of burning gas and a generally rectangular surrounding annulus of burning gas are provided by those burners. As a result, burning gas fills substantially all of the length and width of the heating chamber to provide uniform heat across that length and width.

6 Claims, 4 Drawing Figures

U.S. Patent   Jun. 30, 1987   4,676,221
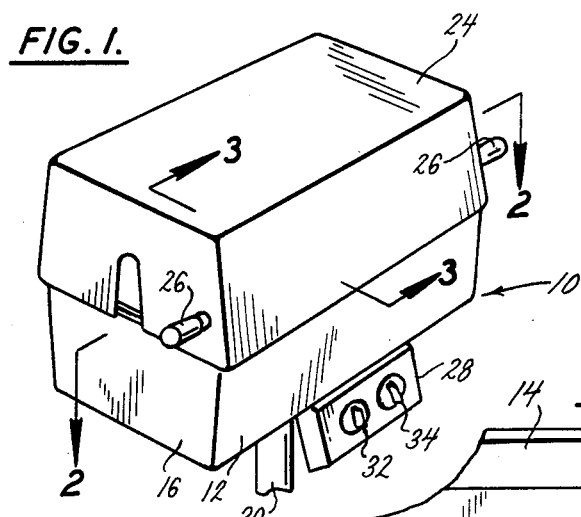
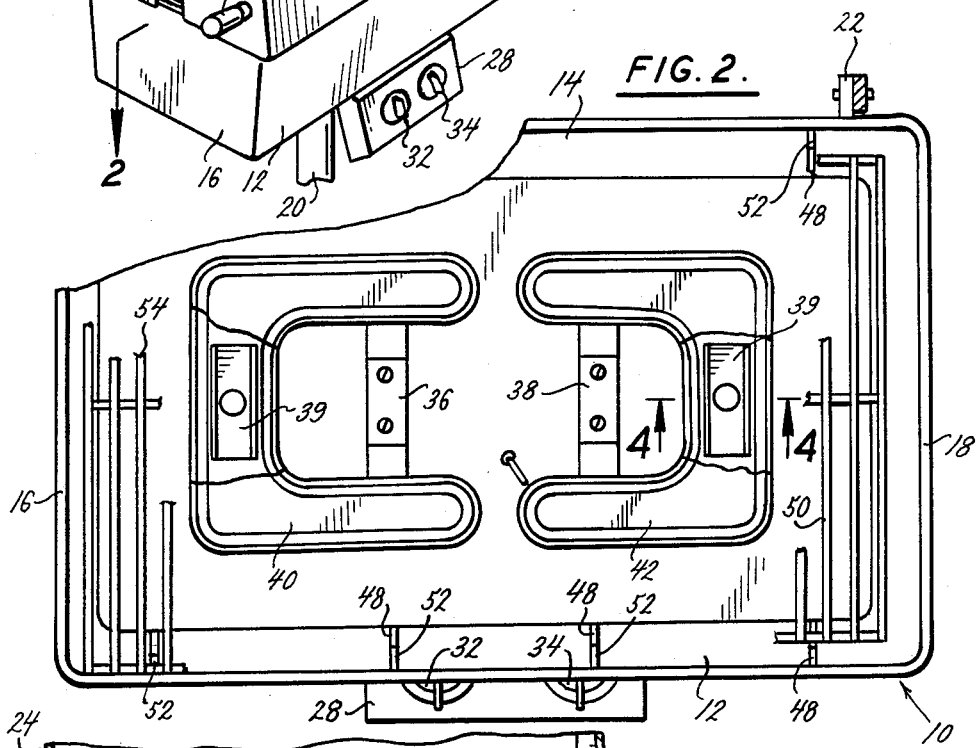
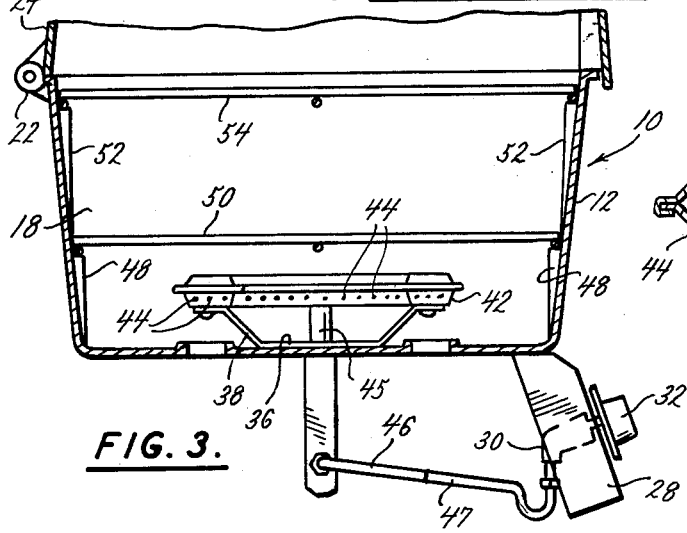
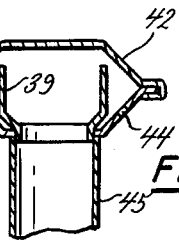

BARBECUE GRILL WITH UNIFORMLY-HEATED HEATING CHAMBER

This is a continuation of copending application Ser. No. 778,694, filed on Sept. 23, 1985, now abandoned.

SUMMARY OF THE INVENTION

Many gas-fired barbecue grills can not provide uniform heating of the heating chambers thereof; and hence some areas of those heating chambers can not provide the heat which is required for optimum cooking conditions. The present invention provides uniform heating of the heating chamber of a barbecue grill by mounting two U-shaped burners within the heating chamber so the arms thereof extend toward each other. Those arms and the ends of those burners define a generally rectangular annulus which surrounds the middle of that heating chamber and which is displaced inwardly from the walls of that heating chamber. Gas-emitting ports are provided in the inner and outer faces of the arms and ends of those burners; and hence those burners provide a central area of burning gas and a generally rectangular surrounding annulus of burning gas. As a rseult, burning gas fills substantially all of the length and width of the heating chamber to provide uniform heat throughout the length and width. It is, therefore, an object of the present invention to provide a heating chamber for a barbecue grill with two U-shaped burners that are arranged to define a central burning area and a surrounding generally rectangular burning area, and that have ports in the inner and outer faces of the arms and ends thereof.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

BRIEF DESCRIPTION OF DRAWING

In the drawing;

FIG. 1 is a perspective view of the upper part of one preferred embodiment of barbecue grill that is made in accordance with the principles and teachings of the present invention;

FIG. 2 is a partially broken away plan view, on a larger scale, of the heating chamber of the barbecue grill of FIG. 1;

FIG. 3 is a sectional view, on the scale of FIG. 2, which is taken along a plane indicated by the line 3—3 in FIG. 1; and FIG. 4 is a sectional view, on a still larger scale, that is taken along a plane indicated by the line 4—4 in FIG. 2.

DETAILED DESCRIPTION OF PREFERRED EMBODIMENT

Referring to the drawing in detail, the numeral 10 generally denotes the heating chamber of a barbecue grill which has a front wall 12, a rear wall 14, a left-hand end wall 16, and a right-hand end wall 18. The numeral 20 denotes a post which supports the heating chamber. The numeral 22 denotes hinges that rotatably hold a cover 24 in assembled relation with that heating chamber; and that cover has insulated handles 26. The numeral 28 denotes a panel which extends downwardly and forwardly from the lower edge of the front wall 12 of the heating chamber 10. Valves 30 are disposed at the rear face of that panel; and those valves have shafts which extend forwardly through that panel and have knobs 32 and 34 thereon. All of the hereinbefore-identified compenents of the barbecue grill can be of standard and usual design and construction; because they are not, per se, parts of the present invention.

The numerals 36 and 38 denote supporting brackets which are secured to the bottom of the heating chamber 10, and which have arms that diverge upwardly and away from each other. The numeral 40 denotes a U-shaped burner which is supported by the bracket 36 and which has its closed end confronting, but spaced inwardly from, the left-hand end wall 16 of the heating chamber 10. The numeral 42 denotes a U-shaped burner which has the closed end thereof confronting, but spaced inwardly from, the right-hand end wall 18 of that heating chamber. The supporting brackets 36 and 38 are of standard and usual design; but the burners 40 and 42 differ from the burners of prior dual burner barbecue grills. Instead of having imperforate outer walls at the ends thereof, as do the burners of prior dual burner barbecue grills, the burners 40 and 42 have ports 44 distributed along the entire lengths of the inner and outer faces of the arms and of the ends thereof. Also, each of those burners has a deflector 39 mounted within the end thereof, as indicted particularly by FIGS. 2 and 4. That deflector is shown as an elongated channel, and it has an opening in the web thereof which is in register with the outlet of the mixer tube 45. The sides of that deflector will guide most of the gas-air mixture, which enters the burner via that mixer tube and that opening, toward the arms of that burner. In doing so, those sides will keep excessive percentages of the gas-air mixture from issuing through the ports 44 in the ends of burners 40 and 42; and, as a result, those burners can provide generally-uniform combustion along the inner and outer faces thereof. Each burner and its deflector and mixer tube will constitute an integral burner unit.

It should also be noted that instead of being mounted in the heating chamber 10 with the ends thereof confronting each other, the burners 40 and 42 are mounted so the arms thereof confront each other and so the ends thereof confront, but are spaced inwardly from, the end walls of that heating chamber. As a result, instead of providing a generally H-shaped burner configuration that has no ports at the center thereof and that has no ports adjacent major portions of the lengths of the end walls of the heating chamber, the burners 40 and 42 coact to provide a generally rectangular annulus which encloses the middle area of the heating chamber 10 while being spaced inwardly from the walls of that heating chamber. Those burners have uniformly-distributed, inwardly-directed ports in the arms and ends thereof, and also have uniformly-distributed, outwardly-directed ports in those arms and ends. The middle area of the heating chamber 10 will be filled with burning gases from the inwardly-directed ports of the arms and ends of the burners 40 and 42; and the generally rectangular annulus will be filled with burning gases from the outwardly-directed ports of those arms and ends. As a result, substantially the entire length and width of the heating chamber 10 will be filled with burning gases —with consequent uniform heating of that heating chamber throughout its length and width.

At least one of the ports 44 in each arm of the burner 40 is close to, and is directed toward, at least one of the ports 44 in the adjacent arm of burner 42. Similarly, at least one of the ports 44 in each arm of the burner 42 is close to, and is directed toward, at least one of the ports 44 in the adjacent arm of burner 40. As a result, burning gas adjacent those ports of burner 42 will promptly ignite the mixed gas and air which issues from those ports of burner 40. As a result, only one igniter system is required, although two burners are used.

The numeral 46 denotes part of the gas line from one of the valves 30 to the mixing tube 45 of the burner 42; and the numeral 47 denotes a part of the gas line from the other valve 30 to the mixing tube of the burner 40. Those gas lines supply gas to the mixing tubes of the burners 40 and 42 at points which are adjacent the end walls of the heating chamber 10. In contrast, the gas lines of prior dual-burner barbecue grills supplied gas at points which were close to the centers of the heating chambers of those grills. Specifically, the gas line 47 supplies gas to the mixing tube which is connected to the end of burner 40; and that end is close to the left-hand end wall 16. The gas line 46 supplies gas to the mixing tube 45 which is connected to the end of burner 42; and that end is close to the right-hand end wall 18.

Ribs 48 are provided at the inner faces of the front and rear walls 12 and 14 of heating chamber 10 to support a grid 50 for lava rocks. Further ribs 52 are provided at the inner faces of the front and rear walls 12 and 14 to support a grid 54 for the meat which is to be cooked by the barbecue grill.

Tests, which have been made of the temperatures within the heating chamber 10, show that those temperatures are more uniform along the length and width of that chamber than are the temperatures along the lengths and widths of the heating chambers of prior barbecue grills wherein the burners provided an H-shaped configuration. Because the burner configuration of the present invention provides more uniform temperatures throughout the length and width of the heating chamber, that burner configuration provides more uniform cooking conditions than were provided by prior dual-burner barbecue grills.

The provision of ports 44 in the outer faces of the ends of the burners 40 and 42, plus the orientation of those burners so those ends are adjacent the ends of the heating chamber 10, make it possible to increase the length of that heating chamber by more than ten percent (10%) without any increase in the size of either of those burners. Specifically, by use of the present invention, it has been possible to increase the length of the heating chamber 10 from twenty-one to twenty-four (21-24) inches without any increase in the size of either of the burners 40 and 42. Alternatively, the present invention makes it possible to use substantially less gas—and yet provide uniform heating along the length and width of the heating chamber—than can prior dual-burner barbecue grills having the same size burners and heating chambers.

Whereas the drawing and accompanying description have shown and described a preferred embodiment of the present invention it should be apparent to those skilled in the art that various changes may be made in the form of the invention without affecting the scope thereof.

What we claim is:

1. A barbecue grill that comprises a heating chamber with a flame-confining wall, a first generally U-shaped gas burner that is disposed within said heating chamber intermediate the middle of said heating chamber and one side of said flame-confining wall of said heating chamber, said first burner having the U-forming end thereof confronting said one side of said flame-confining wall of said heating chamber and having the arms thereof extending toward said middle of said heating chamber, a first valve that selectively supplies gas to be mixed with air and supplied to said first burner, a second generally U-shaped gas burner that is disposed within said heating chamber intermediate said middle of said heating chamber and another side of said flame-confining wall of said heating chamber and that is spaced away from said first burner, said second burner having the U-forming end thereof confronting said other side of said flame-confining wall of said heating chamber and having the arms thereof extending toward said middle of said heating chamber, a second valve that selectively supplies gas to be mixed with air and supplied to said second burner, said U-forming end and said arms of said first burner coacting with said U-forming end and said arms of said second burner to define an open burning area that includes said middle of said heating chamber but that has a gap at each side thereof, said first burner and said second burner being spaced inwardly from said flame-confining wall of said heating chamber so said U-forming end and said arms of said first burner coact with said U-forming end and said arms of said second burner and with said flame-confining wall of said heating chamber to help define an essentially-continuous, flame-receiving annulus that is immediately adjacent said flame-confining wall of said heating chamber, said burners having gas-emitting ports in the inner faces of said arms and of said U-forming ends thereof which enable said burners to establish and maintain gas flames that help substantially fill and fully heat said middle of said heating chamber, and said burners having gas-emitting ports in the outer faces of said arms and of said U-forming ends thereof which enable said burners to establish and maintain gas flames that help substantially fill and fully heat said flame-receiving annulus, whereby gas flames can fill, and can heat, substantially the entire length and width of said heating chamber, the spacing of each of said burners from said flame-confining wall of said heating chamber and also from the other burner enabling admixed gas and air from said gas-emitting ports in said U-forming end and in said arms of each of said burners to provide essentially U-defining, substantially-continuous and unbroken gas flames along the inner and outer faces of said burner when both said first valve and said second valve are open and also enabling admixed gas and air from said gas-emitting ports in said U-forming end and in said arms of either of said burners to provide essentially U-defining, substantially-continuous and unbroken gas flames along the inner and outer faces of said burner when only the valve for said burner is open, the gas flames from the gas-emitting ports in said outer faces of said U-forming end and of said arms of either of said burners and the gas flames from the gas-emitting ports in said inner faces of said U-forming end and of said arms of said burner projecting substantial distances from the periphery of said burner, when the valve for said burner is fully open, to fill the area which is defined by said burner and also to fill the confronting portion of said essentially-continuous, flame-receiving annulus, said burners and said valves being able to selectively, and completely, fill the space between said middle of said heating chamber and said one side of said flame-confining wall of said heating chamber, the space between said middle of said heating chamber and said other side of said flame-confining wall of said heating chamber, or both of said spaces.

2. A barbecue grill as claimed in claim 1 wherein said valves for the gas to be supplied to said burners are close to each other, wherein the gas line from one of said valves extends to a point adjacent one end of said heating chamber to supply gas to the mixing tube for one of said burners, and wherein the gas line from the other of said valves extends to a point adjacent the other end of said heating chamber to supply gas to the mixing tube for the other of said burners.

3. A barbecue grill as claimed in claim 1 wherein a mixing tube for said first burner is connected to the U-forming end of said first burner, wherein a deflector is disposed within said U-forming end of said first burner to deflect mixed gas and air from said mixing tube away from at least some of said ports in said U-forming end of said first burner while providing straight-line paths from said mixing tube to other ports of said first burner, wherein a second mixing tube for said second burner is connected to the U-forming end of said second burner, and wherein a deflector is disposed within said U-forming end of said second burner to deflect mixed gas and air from said second mixing tube away from at least some of said ports in said U-forming end of said second burner while providing straight-line paths from said mixing tube to other ports of said second burner.

4. A barbecue grill as claimed in claim 3 wherein said deflectors are elongated, and wherein said deflectors are directed longitudinally of said U-forming ends of said first and second burners.

5. A barbecue grill that comprises a heating chamber with a flame-confining wall, a first generally U-shaped gas burner that is disposed within said heating chamber adjacent one portion of said wall of said heating chamber, said first burner having the U-forming end thereof adjacent to but spaced inwardly from said one portion of said wall of said heating chamber and having the arms thereof extending toward the middle of said heating chamber, a first valve that selectively supplies gas to be mixed with air and supplied to said first burner, a second generally U-shaped gas burner that is disposed within said heating chamber adjacent a further portion of said wall of said heating chamber, said second burner having the U-forming end thereof adjacent to but spaced inwardly from said further portion of said wall of said heating chamber and having the arms thereof extending toward said middle of said heating chamber and also extending close to but stopping short of said arms of said first burner, a second valve that selectively supplies gas to be mixed with air and supplied to said second burner, said U-forming end and said arms of said first burner coacting with said U-forming end and said arms of said second burner to define a plural-section annular burner that surrounds but does not completely enclose said middle of said heating chamber and that is spaced inwardly from said wall of said heating chamber, said plural-section annular burner coacting with said wall of said heating chamber to substantially define a flame-receiving, heating annulus that is immediately adjacent said flame-confining wall of said heating chamber, each of said burners having a plurality of gas-emitting ports in, and spaced along the lengths of, both the inner and outer faces of said arms and of said U-forming end thereof so said first said burner will provide essentially U-defining, substantially-continuous and unbroken gas flames along each face of said U-forming end and of said arms thereof whether just said first valve is supplying gas to said first burner or said first valve and said second valve are supplying gas to said first burner and said second burner and so said second burner will provide essentially U-defining, substantially-continuous and unbroken gas flames along each face of said U-forming end and of said arms thereof whether just said second valve is supplying gas to said second burner or said first valve and said second valve are supplying gas to said first burner and said second burner, said gas-emitting ports in said burners acting, whenever said first valve and said second valve are fully open, to cause said U-forming end and said arms of said first burner and said U-forming end and said arms of said second burner to direct burning gas directly into, and to fill, said central heating area and also to direct burning gas into, and to fill, said flame-receiving, heating annulus immediately adjacent said flame-confining wall of said heating chamber, whereby gas flames can fill, and can heat, substantially the entire length and width of said heating chamber, at least one arm of said first burner having a gas-emitting port therein which is close to, and which is directed toward, one arm of said second burner, and said one arm of said second burner having a gas-emitting port therein which is close to, and which is directed toward, said one arm of said first burner to facilitate the ignition of admixed gas and air from said gas-emitting port in said one arm of said second burner by burning gas adjacent said gas-emitting port in said one arm of said first burner, said burners enabling said barbecue grill to selectively provide gas flames that fill and substantially-uniformly heat the entire length and width of the one half of said heating chamber that is occupied by said second burner while preventing a gas explosion which might otherwise be caused by gas that might leak to and through said gas-emitting ports in said first burner and also enabling said barbecue grill to selectively provide gas flames that fill and substantially-uniformly heat the entire length and width of the other half of said heating chamber that is occupied by said first burner while preventing a gas explosion which might otherwise be caused by gas that might leak to and through said gas-emitting ports in said second burner.

6. A barbecue grill as claimed in claim 5 wherein said one arm of said first burner is spaced from said one arm of said second burner a distance which is less than the shortest straight-line distance between any portion of said flame-confining wall of said heating chamber and the adjacent outer face of the U-forming end or arms of the adjacent burner, whereby admixed gas and air from said gas-emitting port in said one arm of said second burner has only a very short distance to travel to engage the gas flame from said gas-emitting port in said one arm of said first burner.

* * * * *